May 7, 1940.  C. H. BROWN  2,200,223
FOOT MEASURING APPARATUS
Filed Feb. 24, 1939
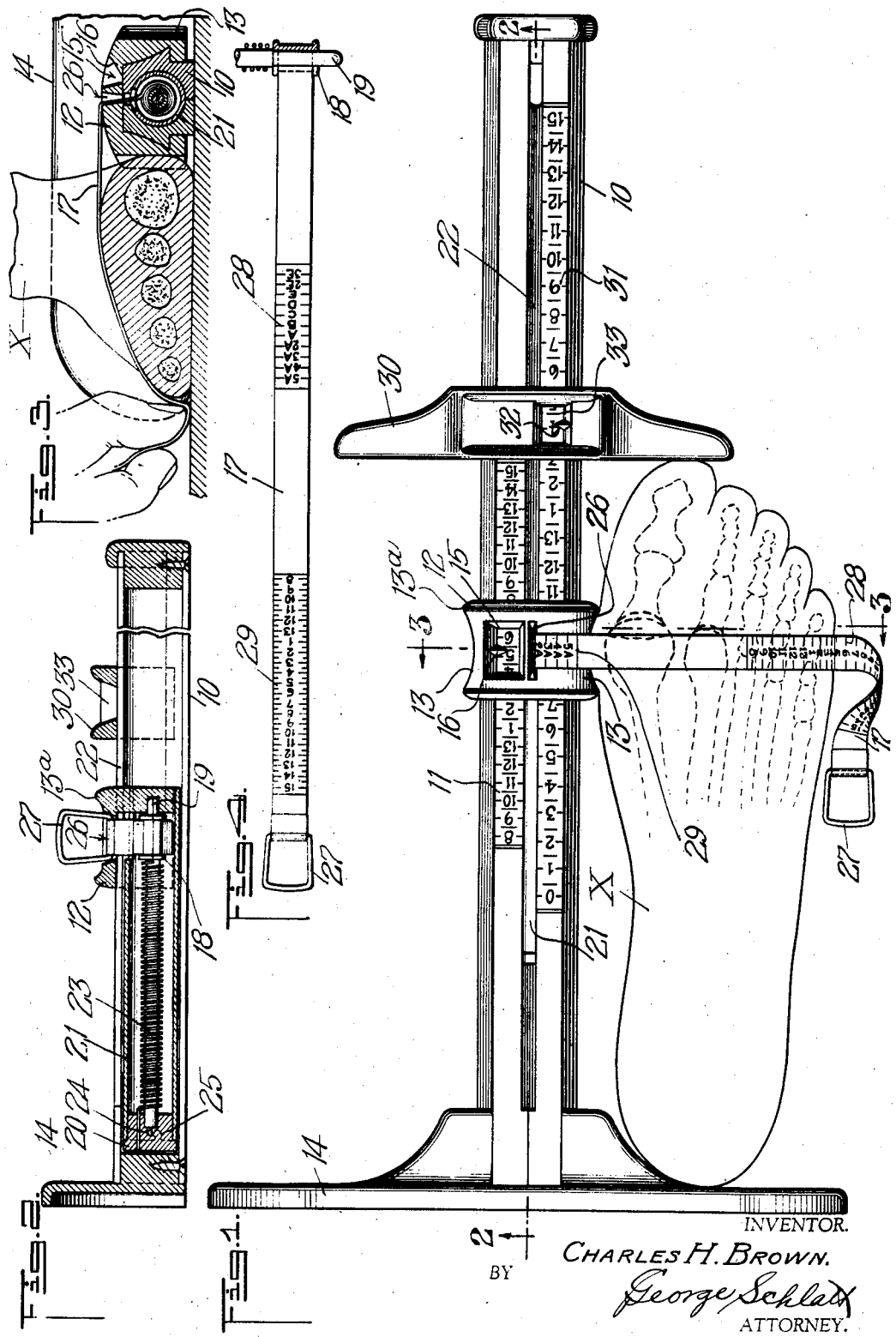
INVENTOR.
CHARLES H. BROWN.
BY George Schlatt
ATTORNEY.

Patented May 7, 1940

2,200,223

UNITED STATES PATENT OFFICE 2,200,223

FOOT MEASURING APPARATUS

Charles H. Brown, New York, N. Y.

Application February 24, 1939, Serial No. 258,148

5 Claims. (Cl. 33—3)

This invention relates to improvements in foot measuring apparatus.

Objects

Among the principal objects which the invention has in view are: to facilitate the operation of measuring the feet of a person being fitted with shoes; to obtain the measurements directly in terms familiar to the customer and those usually employed by shoe manufacturers and dealers in identifying shoe sizes; to avoid computations and possible errors from reference to correcting charts; to provide means for accurately measuring a foot from the heel to the ball joint between the great toe and the foot proper; to provide means for definitely and accurately measuring the transverse portion of the foot in terms of usual width designations for shoes; to coordinate the length measurement and the width measurement for the particular foot being measured; to provide means for accurately locating the position of the ball joint of the great toe with respect to the scale; to assure the width measurement as being made at precisely the proper distance from the heel and at the most protruding part of the ball joint of the great toe; to provide a slidable socket on the measuring device for locating the lengthwise measurement of the foot; to provide an auxiliary means for checking the foot length with respect to the end of the great toe of the foot being measured; to provide a transverse measuring means which is more or less extensible in a lateral direction across the foot in determining the proper width of shoe with respect to the foot of different length; to enable the shoe salesman to readily determine the proper extension of the lateral measuring means and to observe directly upon the lateral measuring means the proper shoe width for any particular foot being measured; to enable the salesman to relate the primary extension of the transverse measuring means to the determined length of the foot and thereafter extend the transverse measuring means a distance equal to the width of the foot plus the amount of primary extension of the measuring means; to provide a transverse measuring means having one scale corresponding to the foot length for determining the primary extension of the transverse means and another scale for giving the determined shoe width; to provide a simple, sturdy, and readily operated construction giving accurate and direct readings; and to obtain other advantages and results as may be brought out in the following description.

Drawing

Figure 1 is a plan of a foot measuring apparatus showing the same in use;

Figure 2 is a longitudinal section on line 2, 2 of Figure 1;

Figure 3 is a transverse section on line 3, 3 of Figure 1; and

Figure 4 is a plan of the transverse measuring means showing a portion of the winding mounting for the same.

Description

The present invention is an improvement upon my prior Patent 1,667,100 of April 24, 1928, and while that patent shows a construction wherein the shoe length is at least theoretically obtained by the measurement from the heel to the ball joint of the great toe, and by a perpendicular measurement from the side of the foot to the other across said joint, the device of that patent necessitated both discretion, judgment and mental aptitude of the salesman in reading and placing the scales and in translating the readings by means of a given table. According to the present invention, the foot here designated as X, is measured with great precision and accuracy and without any particular reliance upon the judgment or mental ability of the salesman. The device of the present invention has in common with the device of the prior patent a two-legged length rule 10 which in use is situated at the side of the foot being measured, a right foot being placed on one side of the rule for measurement and a left foot being placed on the other side of the rule for measurement.

The said rule of this invention has a scale 11 on the upper face thereof and it is the reading from this scale which is directly opposite the ball joint of the toe which may be directly read as the desired shoe length for either men or women. In conjunction with the scale and rule is provided a slide 12, said slide having its laterally directed face concave, as at 13. When a person's foot is placed next the rule the slide 12 is moved to position until the concave side 13 of the slide fits comfortably against the ball joint of the great toe. The rear-end of the rule is provided with a heel stop 14 which is brought against the customer's heel as usual when measuring a foot. Secondly, the salesman determines the shoe length by adjusting the slide so the ridge 13a on slide 12 is adjacent the actual articulation of the great toe joint. As here shown, the slide is provided with an opening 15 through which a portion of scale 11 may be observed, one side of the opening having a pointer 16 which will indicate the reading on the scale represented by any setting of the slide. As shown in Figure 1, the shoe size to which the slide and pointer have been adjusted is indicated as slightly over size 5. When measuring average, or medium sizes it is possible to get accuracy by merely fitting the concave surface of slide 12 to the convex section of the great toe joint of the foot. However, when measuring feet of extreme sizes the convex section of the foot will be either too small or too large to adapt itself properly to the concave section of the slide. Therefore, the slide must be placed in proper relation to the actual articulation of the great toe joint.

The slide also provides means for making a transverse measurement of the foot, the means preferably comprising a flexible tape 17 which may be wound upon a spool 18 within the slide so as to be more or less extensible from the slide. As here shown, spool 18 is upon a shaft 19 one end of which has a bearing within the slide and the other end of which extends rearwardly within the same, and has a bearing in a cap 20 which in turn is inserted in the end of a cylindrical housing 21 also projecting rearwardly of the rule from the said slide. The interior of the rule is hollowed out so as to slidably receive the said housing 21 and the upper face of the rule is longitudinally slotted as at 22 for enabling a portion of the slide to enter therethrough and also for enabling the tape 17 to project through the slot 22 at any longitudinal position of the slide. Furthermore, as here shown, a coil spring 23 is mounted on shaft 19 with the forward end of the spring attached to the shaft or spool in any suitable manner and with its rearward end projecting into cap 20 longitudinally of the cap at a part thereto offset from the axis of both the cap and the shaft. By winding said cap, the spring is coiled to proper tension for winding the measuring tape upon the spool. The cap 20 and housing 21 have convenient means for locking the same against displacement due to the spring pressure, the particular construction illustrated comprising a pin 24 projecting radially from the cap and received by a bayonet slot 25 next the end of the housing. This arrangement permits the spring tension to be adjusted as found desirable. The tape passes through the slot 22 in the rule and also through a slot 26 in the slide at the upper side thereof, this last mentioned slot preferably being exactly midway between the concave side faces 13, 13 of the slide and extending in a direction parallel to the slot 22 of the rule. The outer end of the tape is shown provided with a wire loop 27 which is of greater dimension than said slot 26 so as to act as a stop upon retraction of the tape and has a gripping means for pulling the tape outward to extended position. It will thus be seen that the tape is always ready to use, coiled inside the device and directly opposite the ball joint of the great toe when the slide is brought to its proper position with respect to the joint.

The transverse measuring tape 17 is provided with two scales on each side thereof. The scales on one side of the tape will be used when the tape is drawn over a foot at the right side of the rule and the scales on the other side of the tape will be used when the tape is drawn over a foot at the left side of the rule. Description of the pair of scales at one side of the tape will accordingly suffice for an understanding of both sets of scales. Next the outer end of the tape a scale 28 is shown having its numbers arranged in the same sequence as the numbers on the aforementioned scale 11 on the face of the rule. The distance between the scale markings 28, however, are less than the distances between the scale markings on scale 11 of the rule in a properly predetermined proportion which will give accurate reading of the second scale on the tape. The second scale 29 on the tape, that is a scale which is toward the inner end of the tape, shows shoe widths, such as A, B, C, D, and E together with multiples of A and E readings as is usual in designation of shoe widths. The placing of these scale markings of both scales on the tape are predetermined so that for any size foot the tape will indicate the proper width in relation to the measured length by direct reading of scale 29 next the inner end of the tape at the place where the tape emerges from its slot 26.

Through experience with the device covered by my Patent 1,667,100, it is known that the difference in width measurement between widths on any given size is 1/8". Also it is known that the difference in width measurement between full sizes on any given width is 1/8". Therefore, by virtue of the spring attachment on the tape it is possible to arrive at a definite relationship between scale 28 and scale 29. Under the prior patent it was necessary to take an inch measure of the width and refer to a table under the particular size in question. With the new improvement it is possible to ascertain the proper width without referring to a table.

In use, the salesman first places the rule with the heel stop 14 against the heel of the customer's foot and then brings the slide into comfortable juxtaposition with the ball joint of the great toe. The salesman then reads the shoe length from scale 11 on the rule which pointer 16 indicates, which in this instance is size 5. The salesman then pulls out the tape and places his thumb nail upon the same scale designation (in this case upon 5) of that scale which he read upon the scale on the rule. The tape is then drawn over to the far side of the customer's foot and the tape beneath his thumb nail pressed to the floor. He then reads from the second scale 29 of the tape at the point of exit from slot 26 and reads directly the width of shoe which the customer requires, and which in the present instance is a double A. It will accordingly be observed that the device enables direct readings to be made both as to length and width and does not require any correcting chart to be employed as usually necessary in connection with the device of my prior patent.

Where so desired, a check may be made upon the proper shoe length, usually only for purposes of satisfying the customer, by providing a slidable toe piece 30 on the rule and an auxiliary scale 31 upon the rule showing readings for the length of shoe as indicated by an arrow 32 from one wall of an opening 33 in the top of the toe piece. This toe piece is brought against the end of the great toe as has been done in the old system of measuring over-all shoe lengths. If the foot being measured is of perfect proportions the reading on both scales will be identical. However, in most cases there will be a discrepancy such as indicated in Figure 1. The foot shown here has a short forepart in relation to its rearpart.

I claim:

1. A foot measuring apparatus comprising a hollow rule having a longitudinal slot, a slide on said rule with a portion thereof projecting through said slot to the hollow interior thereof, a tape, and means for mounting and winding the tape within the rule and carried by said slide enabling the tape to be withdrawn from the slide at any adjusted position of the slide with respect to the rule.

2. A foot measuring apparatus comprising a rule having a heel stop at one end and having a scale, in combination with a slide on said rule, said slide having a concave side for engaging the ball joint of a foot the heel of which is placed against the heel stop, the said scale being calibrated to thereupon directly indicate the foot length, and means carried by the slide for measuring the foot width across the ball joint in a plane perpendicular to the rule, said means having a scale for compensating for the length of the foot, and a scale for thereupon giving a direct reading of shoe width for a foot of the measured length.

3. A foot measuring apparatus comprising a rule having a heel stop at one end and having a scale, in combination with a slide on said rule, said slide having opposite concave sides each for engaging the ball joint of a foot the heel of which is placed against the heel stop, the said scale being calibrated to thereupon directly indicate the foot length, said slide having a slot midway between its side concave walls and extending in a direction longitudinally with respect to the rule, and a tape movable into and out of said slot for extending across the foot on either side of the slide, said tape having a scale designation on both sides thereof enabling a reading to be made where the tape leaves the slot with either side of the tape uppermost.

4. A foot measuring apparatus comprising a rule having a heel stop and having a scale, in combination with a slide on said rule adapted to be positioned with respect to a foot and indicate the foot length on said scale, and a spring actuated tape mounted in said slide and movable therewith and longitudinally withdrawable from the slide for measuring the foot width and when released retractable into the slide.

5. A foot measuring apparatus comprising a rule having a heel stop at one end and having a scale, in combination with a slide on said rule, said slide having opposite concave sides each for engaging the ball joint of a foot the heel of which is placed against the heel stop, the said scale being calibrated to thereupon directly indicate the foot length, said slide having a slot midway between its side concave walls and extending in a direction longitudinally with respect to the rule, and a tape movable into and out of said slot for extending across on either side of the slide, said tape having a scale designation on both sides thereof enabling a reading to be made where the tape leaves the slot with either side of the tape uppermost, and said slide having an opening with a pointer adjacent said slot and directly over the scale on said rule whereby a shoe size will be given for the foot being measured.

CHARLES H. BROWN.